(12) United States Patent
Kawaoka et al.

(10) Patent No.: US 7,543,138 B1
(45) Date of Patent: Jun. 2, 2009

(54) IMAGE SERVER AND METHOD OF CONTROLLING SAME

(75) Inventors: Yoshiki Kawaoka, Asaka (JP); Norihisa Haneda, Asaka (JP); Hiroshi Suganuma, Asaka (JP); Hiroyuki Yoshinaga, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1155 days.

(21) Appl. No.: 09/667,701

(22) Filed: Sep. 22, 2000

(30) Foreign Application Priority Data

Sep. 27, 1999 (JP) ................................. 11-271892

(51) Int. Cl.
*H04L 9/00* (2006.01)
*G06F 12/14* (2006.01)
*H04N 1/44* (2006.01)
*G03B 27/14* (2006.01)

(52) U.S. Cl. ........................ 713/150; 713/165; 713/179; 713/181; 713/189; 726/26; 380/243; 355/112

(58) Field of Classification Search ................ 713/178, 713/164, 193, 201, 150; 382/232, 306, 100, 382/162; 348/161, 231.6; 705/1, 51; 345/719; 358/1.9, 403; 711/151; 463/42; 714/20
See application file for complete search history.

(56) References Cited

U.S. PATENT DOCUMENTS

| | | | | |
|---|---|---|---|---|
| 5,796,869 A * | 8/1998 | Tsuji et al. | ................... | 382/203 |
| 5,822,083 A * | 10/1998 | Ito et al. | ...................... | 358/403 |
| 5,958,005 A * | 9/1999 | Thorne et al. | ................ | 709/202 |
| 6,011,897 A * | 1/2000 | Koyama et al. | ................ | 386/95 |
| 6,166,729 A * | 12/2000 | Acosta et al. | ................ | 345/719 |
| 6,173,418 B1 * | 1/2001 | Fujino et al. | ................... | 714/20 |
| 6,181,436 B1 * | 1/2001 | Kurachi | ...................... | 358/1.15 |
| 6,209,097 B1 * | 3/2001 | Nakayama et al. | ........... | 713/193 |
| 6,226,412 B1 * | 5/2001 | Schwab | ....................... | 382/232 |
| 6,272,506 B1 * | 8/2001 | Bell | ............................ | 715/255 |

(Continued)

FOREIGN PATENT DOCUMENTS

EP  459792 A2 * 12/1991

(Continued)

OTHER PUBLICATIONS

Japanese Notice of Reasons for Refusal dated Oct. 24, 2006, with English translation.

(Continued)

*Primary Examiner*—Christopher A Revak
*Assistant Examiner*—Aravind K Moorthy
(74) *Attorney, Agent, or Firm*—McGinn IP Law Group, PLLC

(57) ABSTRACT

An image registration server stores encryption keys of respective ones of a plurality of client terminals. Image data is encrypted by the image registration server using the encryption key corresponding to the client terminal to which the image data is applied. The encrypted image data is applied to the client terminal via a server. The client terminal has a decryption key stored within so that only a client terminal that is duly authorized can decrypt encrypted image data. Other client terminals that are not duly authorized cannot decode the image data. This makes it possible to prevent unlawful use of image data even if the image data has been intercepted.

2 Claims, 21 Drawing Sheets

U.S. PATENT DOCUMENTS

| | | | |
|---|---|---|---|
| 6,298,421 B1 * | 10/2001 | Minamizawa et al. | 711/151 |
| 6,366,685 B1 * | 4/2002 | Takaragi | 382/140 |
| 6,367,992 B1 * | 4/2002 | Aruga et al. | 400/76 |
| 6,473,859 B1 * | 10/2002 | Enokida | 713/164 |
| 6,539,482 B1 * | 3/2003 | Blanco et al. | 713/201 |
| 6,578,053 B1 * | 6/2003 | Kidokoro et al. | 707/201 |
| 6,603,864 B1 * | 8/2003 | Matsunoshita | 382/100 |
| 6,611,347 B1 * | 8/2003 | Okada et al. | 358/1.15 |
| 6,690,843 B1 * | 2/2004 | Squilla et al. | 382/306 |
| 6,711,285 B2 * | 3/2004 | Noguchi | 382/162 |
| 6,751,596 B1 * | 6/2004 | Hastings | 705/10 |
| 2003/0137680 A1 * | 7/2003 | Maruoka | 358/1.13 |

FOREIGN PATENT DOCUMENTS

| | | |
|---|---|---|
| JP | 7-154520 | 6/1995 |
| JP | 07-334645 | 12/1995 |
| JP | 08-065438 | 3/1996 |
| JP | 08-190545 | 7/1996 |
| JP | 09-134264 | 5/1997 |
| JP | 09-146731 | 6/1997 |
| JP | 09-231612 | 9/1997 |
| JP | 10-055222 | 2/1998 |
| JP | 10-200679 | 7/1998 |
| JP | 10-320534 | 12/1998 |
| JP | 11-105374 | 4/1999 |
| JP | 11-224285 | 8/1999 |
| JP | 11-250192 | 9/1999 |
| JP | 11-261745 | 9/1999 |
| WO | WO 9913391 A2 * | 3/1999 |

OTHER PUBLICATIONS

Japanese Office Action date Jan. 23, 2007 with English Translation.

* cited by examiner

Fig. 3

```
                        ┌──────────────┐
                        │KEYBOARD/MOUSE│─38
                        └──────┬───────┘
                               │
   ┌───────────────────────────┼──────────────────────┐
   │   ┌───────┐ ┌───┐ ┌──────────┐ ┌──────────┐      │
 1─│   │MODEM  │ │CPU│ │KEYBOARD/ │ │ DISPLAY  │      │
   │   │   35  │ │ 31│ │  MOUSE   │ │ CONTROL  │      │
   │   │       │ │   │ │ CONTROL  │ │ CIRCUIT  │      │
   │   │       │ │   │ │ CIRCUIT  │ │          │      │
   │   └───┬───┘ └─┬─┘ └────┬─36──┘ └────┬─37──┘      │
   │       │       │        │            │            │   ┌────────┐
   │       ├───────┼────────┼────────────┼────────────┼───│DISPLAY │─41
   │       │       │        │            │            │   └────────┘
   │   ┌───┴───┐ ┌─┴────┐ ┌─┴──────┐     │            │
   │   │ SCSI  │ │MEMORY│ │HARD-   │     │            │
   │   │   32  │ │  33  │ │DISK    │     │            │
   │   │       │ │      │ │DRIVE 34│     │            │
   │   └───┬───┘ └──────┘ └────────┘     │            │
   │       │         IMAGE REGISTRATION SERVER        │
   └───────┼────────────────────────────────────────────┘
           │
   ┌───────┴──────┐
   │   FLATBED    │─39
   │   SCANNER    │
   └──────────────┘
   ┌──────────────┐
   │ CARD READER  │─40
   └──────────────┘
```

*Fig. 4*

| CLIENT TERMINAL | KEY USED IN ENCRYPTION |
|---|---|
| NO. 1 ONLINE CLIENT TERMINAL | KEY A |
| NO. 2 ONLINE CLIENT TERMINAL | KEY B |
| ⋮ | ⋮ |
| NO. 1 OFFLINE CLIENT TERMINAL | KEY F |
| NO. 2 OFFLINE CLIENT TERMINAL | KEY G |
| ⋮ | ⋮ |

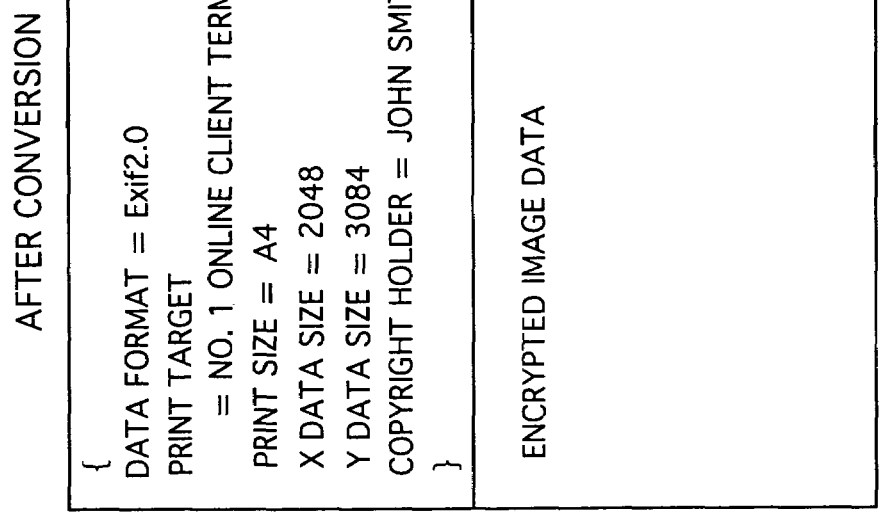
Fig. 10b (AFTER CONVERSION)
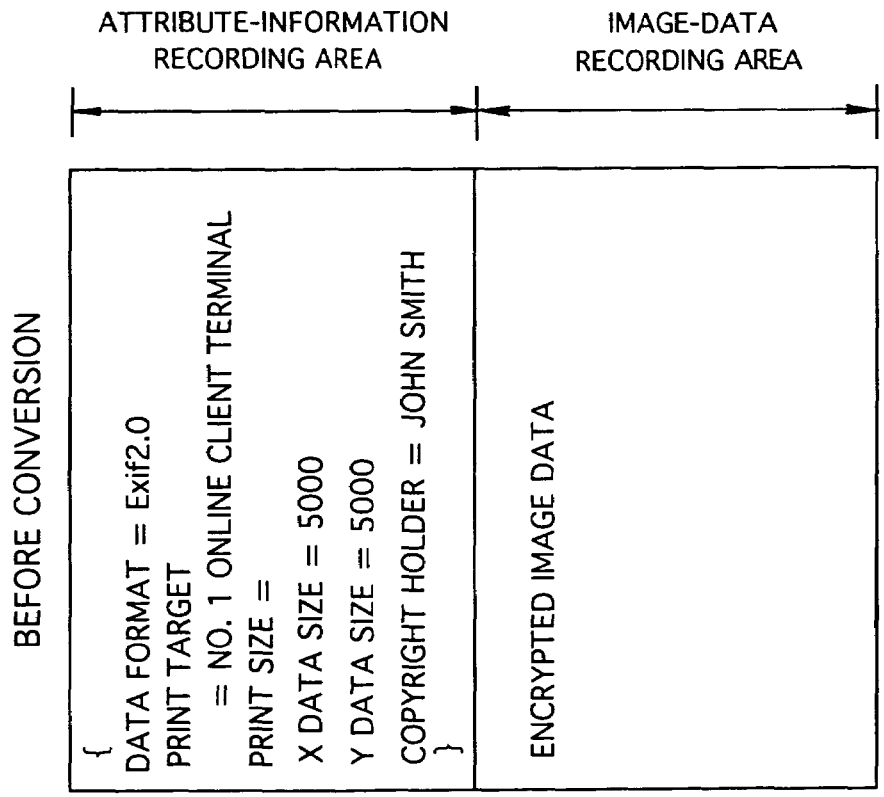
Fig. 10a (BEFORE CONVERSION)

CLIENT TERMINAL
(SERIAL NO. ABC0001)

BEFORE INSTALLATION

{
NUMBER OF INSTALLATIONS = 0
INSTALLATION KEY = first time
}

INSTALL ⇨

AFTER INSTALLATION

{
NUMBER OF INSTALLATIONS = 1
INSTALLATION KEY = ABC0001
}

LOG DATA (TRANSMISSION)

TERMINAL ID : 0123ABC

IMAGE ID : 12110-00008-00000

SERVICE TIME : 8/9/1999; 18:54

PAPER TYPE : A6

NUMBER OF PRINTS : 2

LOG DATA (FD)

ROOT
— TERMINAL ID
    — 3210XYZ
— IMAGE ID
    — 13123-00017-00000
— SERVICE TIME
    — 8/13/1999 17:35
— PAPER TYPE
    — SEAL
— NUMBER OF PRINTS
    — 2

*Fig. 21*

UNIFIED- FORMAT DATA

<PERSONAL INFORMATION>
    <TERMINAL ID>
    <IMAGE ID>
    <SERVICE TIME>
    <PAPER TYPE>
    <NUMBER OF PRINTS>

Fig. 22

AGGREGATE LOG DATA

```
<PERSONAL INFORMATION>
   <TERMINAL ID> 0123ABC <¥TERMINAL ID>
   <IMAGE ID> 12110-00008-00000 <¥IMAGE ID>
   <SERVICE TIME> 8/9/1999  18:54 <¥SERVICETIME>
   <PAPER TYPE> A6 <¥PAPER TYPE>
   <NUMBER OF PRINTS> 2 <¥NUMBER OF PRINTS>
<¥PERSONAL INFORMATION>
<PERSONAL INFORMATION 2>
   <TERMINAL ID> 3210XYZ <¥TERMINAL ID>
   <IMAGE ID> 13123-00017-00000 <¥IMAGE ID>
   <SERVICE TIME> 8/13/1999  17:35 <¥SERVECIE TIME>
   <PAPER TYPE> SEAL <¥PAPER TYPE>
   <NUMBER OF PRINTS> 3 <¥NUMBER OF PRINTS>
<¥PERSONAL INFORMATION 2>
```

IMAGE SERVER AND METHOD OF CONTROLLING SAME

BACKGROUND OF THE INVENTION

1. Field of the Invention

This invention relates to an image server and a method of controlling the same, a client terminal and a method of controlling the same, an image printing system and method, a data installing apparatus and a method of controlling the same, an image data output apparatus and method, and a printing management apparatus and method.

2. Description of the Related Art

With the growth of the Internet and the widespread use of personal computers, it has become possible for individuals to send and receive data containing a large quantity of data, such as image data. A large quantity of image data can be stored in a server in advance, the image data can be downloaded by accessing the server and images represented by the image data can be printed using a printer.

It is a general rule that an individual who takes or creates a picture has the copyright to the picture. Copyright-free pictures (pictures for which the copyright has been abandoned) are the exception rather than the rule.

Accordingly, it is important to prevent persons who are not duly authorized users from making unlawful use of image data, as by inhibiting printing of images. To achieve this, copyright management of images is vital.

SUMMARY OF THE INVENTION

Accordingly, an object of the present invention is to arrange it so that an individual having the legal privilege to an image can utilize the image.

Another object of the present invention is to manage the printing conditions of an image in a comparatively simple manner.

According to a first aspect of the present invention, the foregoing objects are attained by providing an image server for outputting encrypted image data to at least one client terminal among a plurality thereof, comprising: a selection unit for selecting, from among the plurality of client terminals, a client terminal to which image data is to be output; an encryption unit (encryption means) for encrypting the image data using an encryption key which corresponds to the client terminal that has been selected by the selection unit; and an encrypted image data output unit for outputting image data that has been encrypted by the encryption unit.

The first aspect of the present invention provides also a method of controlling the above-described image server. Specifically, there is provided a method of controlling an image server for outputting encrypted image data to at least one client terminal among a plurality thereof, the method comprising the steps of: selecting, from among the plurality of client terminals, a client terminal to which image data is to be output; encrypting the image data using an encryption key which corresponds to the client terminal that has been selected; and outputting image data that has been encrypted.

In accordance with the first aspect of the present invention, an encryption key used for encryption is decided for each of the plurality of client terminals. (For example, an encryption key may be decided for each group of a plurality of client terminals or a different encryption key may be decided for each client terminal.) At least one client terminal is selected from among the plurality thereof. Image data is encrypted using the encryption key corresponding to the selected client terminal, and the encrypted image data is output to the selected client terminal.

Thus, in accordance with the first aspect of the present invention, an encryption key is decided for each client terminal and encryption is performed using the encryption key that corresponds to the selected client terminal. By deciding a decryption key corresponding to an encryption key for every client terminal, decryption can be carried out using the decryption key that has been decided. Decryption can be performed at one client terminal among a plurality thereof, thereby making it possible to prevent decryption at the other client terminals. Thus, a user or operator of an unauthorized client terminal will not be able to decrypt image data that has been encrypted.

Image data may be output by transmitting the image data, or an arrangement may be adopted in which image data is output by being recorded on a portable recording medium (a floppy disk, CD-ROM, memory card, etc.).

Image data may include high-resolution image data for printing and display image data having a resolution lower than that of the high-resolution image data for printing.

In this case, the high-resolution image data for printing would be encrypted.

Since the display image data need not necessarily be encrypted, it can be displayed without decryption. Because the display image data has a resolution lower than that of the image data for printing, damage ascribable to any unlawful use will be minimal.

A second aspect of the present invention relates to the decrypting of image data that has been encrypted by the first aspect of the present invention. A client terminal in accordance with the second aspect of the present invention comprises an input unit for inputting image data that has been encrypted using an encryption key which corresponds to this client terminal; a decryption unit (decryption means) for decrypting encrypted image data, which has been input by the input unit, using the corresponding decryption key; and an output unit for outputting image data that has been decrypted by the decryption unit.

The second aspect of the present invention provides also a control method suited to the above-described client terminal. Specifically, the method comprises the steps of: inputting image data that has been encrypted using an encryption key which corresponds to the client terminal; decrypting input encrypted image data using the corresponding decryption key; and outputting image data that has been decrypted.

In accordance with the second aspect of the present invention, image data that has been encrypted using an encryption key corresponding to a client terminal is entered. The entered encrypted image data is decrypted by the corresponding decryption key and then output.

Thus, decryption can be performed using a decryption key even if the encryption key differs for each client terminal.

Input of encrypted image data may be performed by receiving image data that has been transmitted or by reading encrypted image data that has been recorded on a portable recording medium.

Further, output of decrypted image data may be performed by transmitting decrypted image data or by writing decrypted image data to a portable recording medium.

An image printing system according to a third aspect of the present invention comprises: an image selection unit for selecting at least one image from among a plurality thereof; a print command unit for applying a command to print the image that has been selected by the image selection unit; and a printing unit, which is responsive to a print command applied by the print command unit, for printing, on the same visible recording medium, the image that has been selected by the image selection unit and information relating to a copyright holder of the selected image.

The third aspect of the present invention provides also a method suited to the above-described system. Specifically, the method comprises the steps of: selecting at least one image from among a plurality thereof; receiving a command to print the image that has been selected; in response to a print command applied by the print command unit, printing, on the same visible recording medium, the image that has been selected and information relating to a copyright holder of the selected image.

In accordance with the third aspect of the present invention, one image is selected from among a plurality thereof. When a command to print a selected image is applied, the selected image and information relating to the copyright holder of the image are printed on the same visible recording medium.

Since an image and information relating to the copyright holder of the image are recorded on the same visible recording medium, the copyright holder of the image can be ascertained merely by looking at the visible recording medium. Since the copyright holder of the image can be determined, unlawful use of the printed image can be prevented.

The information relating to the copyright holder may be the name of the copyright holder per se, an indication to the effect that the image is not copyright free, or image indicating the source of the image.

Information relating to the copyright holder may be input by the operator or may be stored as data in the same image file that contains the image data representing the image. The image data is read-out of the file and the image represented by the image data is printed. Data representing the information relating to the copyright holder is read out of this file and the information relating to the copyright is recorded on the visible recording medium on which the image has been recorded.

The visible recording medium refers to a medium such as paper or film on which an image is printed so that the image can be seen by the human eye.

Data in which the image data representing a plurality of images and information relating to the copyrights of these images are associated with each other may be entered. In this case a desired image would be selected from among the plurality of images represented by the entered image data.

An image printing system according to a fourth aspect of the present invention comprises: a scanner for reading an image that has been recorded on a visible recording medium and outputting image data representing the read image; a determination unit (determination means) for determining whether an image that has been read by the scanner contains information relating to a copyright holder of the image; an image printing unit for printing an image, which has been read by the scanner, in accordance with a determination by the determination unit that the read image does not contain information relating to the copyright holder; and a printing controller (printing control means) for halting normal printing of the image by the image printing unit in accordance with a determination by the determination unit that the read image contains information relating to the copyright holder.

The fourth aspect of the present invention provides also a method suited to the above-described system. Specifically, the method comprises the steps of: reading an image that has been recorded on a visible recording medium and acquiring image data representing the read image; determining whether an image that has been read contains information relating to a copyright holder of the image; printing an image, which has been read, in accordance with a determination that the read image does not contain information relating to the copyright holder; and halting normal printing of the image in accordance with a determination that the read image contains information relating to the copyright holder.

In accordance with the fourth aspect of the present invention, an image that has been recorded on the visible recording medium is read. It is determined whether the read image contains information relating to the copyright holder of this image. If it is determined that the read image does not contain information relating to the copyright holder of the image, then the read image is printed. If it is determined that the read image contains information relating to the copyright holder of the image, normal printing of this read image is halted.

If an image contains information relating to the copyright holder, then this image is considered not to be copyright free. Accordingly, there is the danger that the image may be decrypted unlawfully by a person other than a duly authorized user. In accordance with the fourth aspect of the present invention, normal printing is halted if an image contains information relating to a copyright holder. As a result, unlawful decryption of an image by a person other than a duly authorized user can be prevented.

Normal printing means printing such that the image obtained by printing is recognized as being substantially identical with the original image. The halting of normal printing means stopping the printing of an image per se, performing printing such that the printed image will not be recognized as being the original image, e.g., printing a warning statement, which indicates that the copy is unlawful, in a form superimposed on the original image, or printing only a portion of the original image. In any case, it will suffice if the image obtained by printing is one that will not be recognized as being identical with the original image.

In accordance with a fifth aspect of the present invention, there is provided a data installing apparatus for reading data from a first portable recording medium on which the data has been recorded and installing the image data that has been read, wherein a unique first password has been stored in an image printing unit and the apparatus comprises: a password reading unit for reading a second password from a second portable recording medium on which the second password has been rewritably recorded; a password determination unit (password determination means) for determining whether the first password and the second password, which has been read by the password reading unit, match; a first installation unit (first installation means) for executing the installation in response to a determination by the password determination unit that the first and second passwords match; and an installation inhibiting unit (installation inhibiting means) for inhibiting the installation in response to a determination by the password determination unit that the first and second passwords do not match.

The fifth aspect of the present invention provides also a method suited to the above-described data installation apparatus. Specifically, there is provided a data installation method in a data installing apparatus for reading data from a first portable recording medium on which the data has been recorded and installing the image data that has been read, wherein a unique first password has been stored in the data installation apparatus and the method comprises the steps of: reading a second password from a second portable recording medium on which the second password has been rewritably recorded; determining whether the first password and the second password, which has been read, match; executing the installation in response to a determination that the first and second passwords match; and inhibiting the installation in response to a determination that the first and second passwords do not match.

In accordance with the fifth aspect of the present invention, data (image data, programs, etc.) has been recorded on the first portable recording medium. Further, the unique first password has been stored in the data installing apparatus (e.g., an image printing apparatus). Furthermore, the second password has been rewritably stored on the second portable recording medium.

Before data that has been stored on the first portable recording medium is installed in the data installing apparatus, the second password is read from the second portable recording medium and then it is determined whether the read second password matches the first password of the data installing apparatus.

If the two passwords match, then it is recognized that the first portable recording medium is for the data installing apparatus having the matching first password. Image data that has been stored on the first portable recording medium can be installed in the data installing apparatus. If the two passwords do not match, then it is construed that the first portable recording medium is not for the data installing apparatus having the first password and that an attempt is being made to perform installation by utilizing it for another data installing apparatus. Image data that has been stored on the first portable recording medium is inhibited from being installed in the data installing apparatus.

In accordance with the fifth aspect of the present invention, data that can be installed in the data installing apparatus is data that has been recorded on the first portable recording medium for this data installing apparatus. Data that has been recorded on the first portable recording medium determined to be for prescribed data installing apparatus is inhibited from being installed in the other data installing apparatus. Thus, data can be installed only by a duly authorized person (i.e., in a legitimate data installing apparatus). This makes it possible to prevent unlawful installation.

Data indicating the number of installations may be recorded on the second portable recording medium. In this case the data indicating the number of installations recorded on the second portable recording medium is read and, when the number of installations indicated by this read data is zero, password determination is halted. The installation is executed in response to the halting of password determination and the number of installations indicated by the data that has been recorded on the second portable recording medium is incremented in response to execution of installation.

When the number of installations is zero, the first installation takes place. When installation is performed the first time, this is construed as being a lawful installation and execution of the installation is allowed.

The second password may be the initial data prevailing before installation. In this case installation is inhibited in response to a number of installations that is zero and, moreover, a second password that is not initial data.

When the number of installations is zero, the second password should be initial data. When the second password is not initial data regardless of the fact that the number of installations is zero, this means that a malfunction has occurred. Installation is inhibited as a result.

In accordance with a sixth aspect of the present invention, there is provided an image data output apparatus for outputting image data corresponding to a plurality of image printing units which print images represented by image data, comprising: a designation unit for designating an output destination of applied image data from among the plurality of image printing units; a format conversion unit (format conversion means) for converting a format of the applied image data so as to obtain a format conforming to the image printing unit that has been designated by the designation unit; and an image data output unit for outputting the image data, the format whereof has been converted by the format conversion unit, to the image printing unit that has been designated by the designation unit.

The sixth aspect of the present invention provides also a method suited to the above-described image data output apparatus. Specifically, there is provided an image data output method in an image data output apparatus for outputting image data corresponding to a plurality of image printing units which print images represented by image data, comprising the steps of: designating an output destination of applied image data from among the plurality of image printing units; converting a format of the applied image data so as to obtain a format conforming to the image printing unit that has been designated; and outputting the image data, the format whereof has been converted, to the image printing unit that has been designated.

In accordance with the sixth aspect of the present invention, image data is applied. An output destination of the applied image data is designated from among a plurality of image printing units and the format of the applied image data is converted so as to become a format conforming to the designated image printing unit. (For example, the size of the image is adjusted to the size of the image printed by the image printing unit.) The image data having the format obtained by the conversion is output to the designated image printing unit.

Thus, image data undergoes a format conversion so as to be suited to the designated image printing unit and then is output to this printing unit. As a result, a format conversion at the image printing unit is unnecessary. This makes it possible to use an image printing unit having a simple construction.

When the image printing unit and the image data output apparatus are capable of sending and receiving data, image data whose format has been converted can be output by being transmitted from the image data output apparatus to the image printing unit. When the image printing unit and image data output apparatus cannot send and receive data, image data that has been output from the image data output apparatus is recorded on a portable recording medium. The portable recording medium on which the image data has been recorded is carried to the corresponding image printing unit, where the image data that has been recorded on the portable recording medium is read.

An image file containing the image data and data indicating the output destination of this image data may be entered. In this case the output destination of the image data would be designated by the data indicating the output destination that is contained in the entered image file.

In accordance with a seventh aspect of the present invention, there is provided a printing management apparatus for managing printing conditions in a plurality of image printing units which print images represented by image data, wherein data representing printing history is output from the image printing units and the apparatus comprises: a reading unit for reading data representing the printing history output from the image printing units, and a format conversion unit (format conversion means) for converting the data representing the printing history read by the reading unit to data having a predetermined format.

The seventh aspect of the present invention provides also a method suited to the above-described printing management apparatus. Specifically, there is provided a printing management method for managing printing conditions in a plurality of image printing units which print images represented by image data, wherein data representing printing history is output from the image printing units and the method comprises the steps of: reading data representing the printing history output from the image printing units, and converting the data representing the printing history read to data having a predetermined format.

In accordance with the seventh aspect of the present invention, data representing printing history is output from the image printing units and the data that has been output is read. The read data representing the printing history is converted to data having a predetermined format.

In accordance with the seventh aspect of the present invention, data representing printing history is converted to data having a predetermined format. Since the data representing the printing history can be unified in a predetermined format, management is comparatively easy to perform. Editing of the data representing the printing history also comparatively simple to carry out.

The format-converted data representing the printing history may be aggregated for each of the plurality of image printing units.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a block diagram illustrating the electrical construction of an image recording server;

FIG. 4 is a table illustrating the relationship between client terminals and encryption keys used when applying image files to these client terminals;

FIGS. 10a and 10b illustrate the content of an attribute-information recording area and image-data recording area included in an image file;

FIG. 21 illustrates an example of unified-format data; and

FIG. 22 illustrates an example of aggregate log data.

DESCRIPTION OF THE PREFERRED EMBODIMENT

A preferred embodiment of the present invention will now be described with reference to the drawings.

Figure 1:
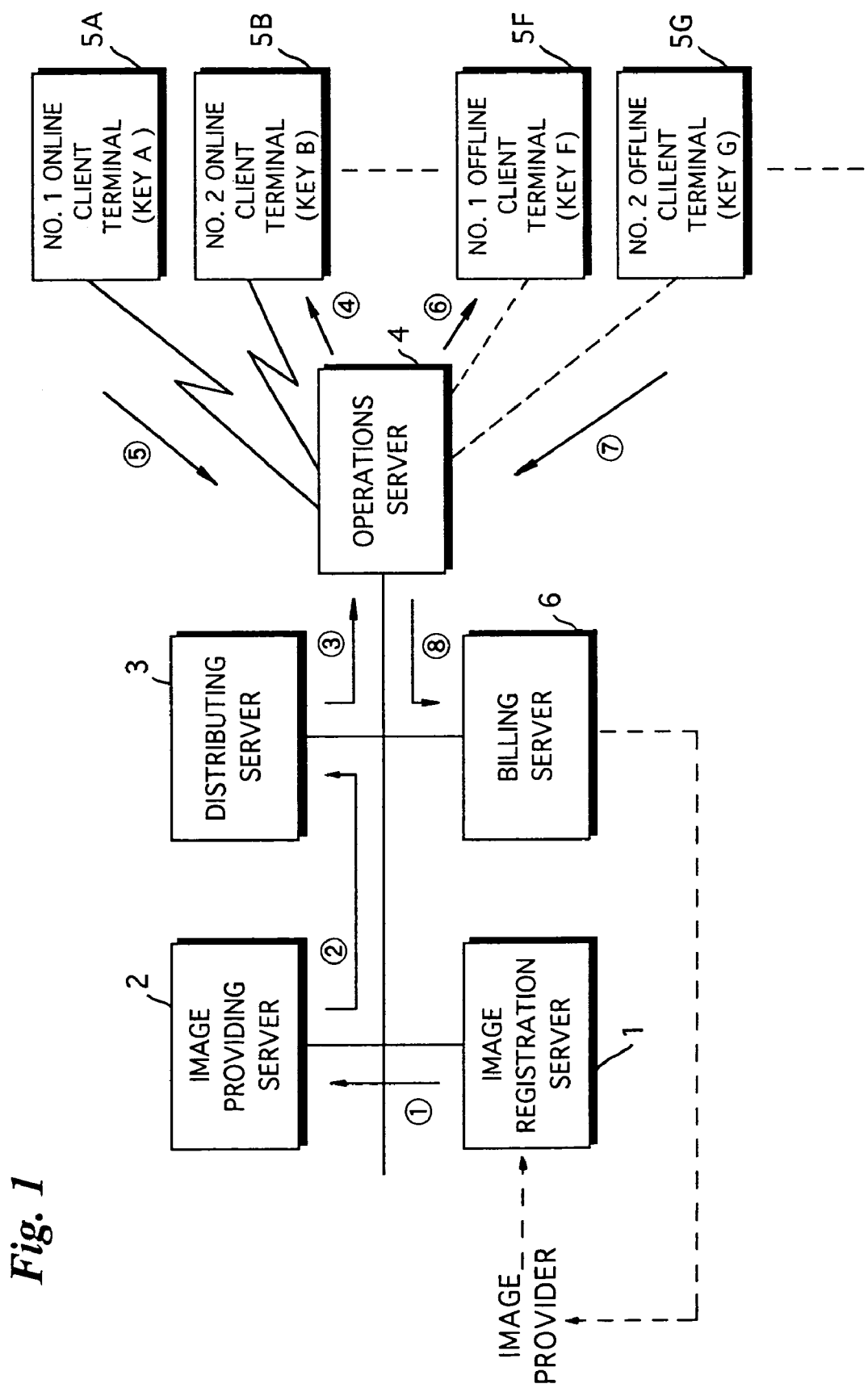
FIG. 1 is a block diagram illustrating the overall configuration of an image communication system according to a preferred embodiment of the present invention.
Figure 2:
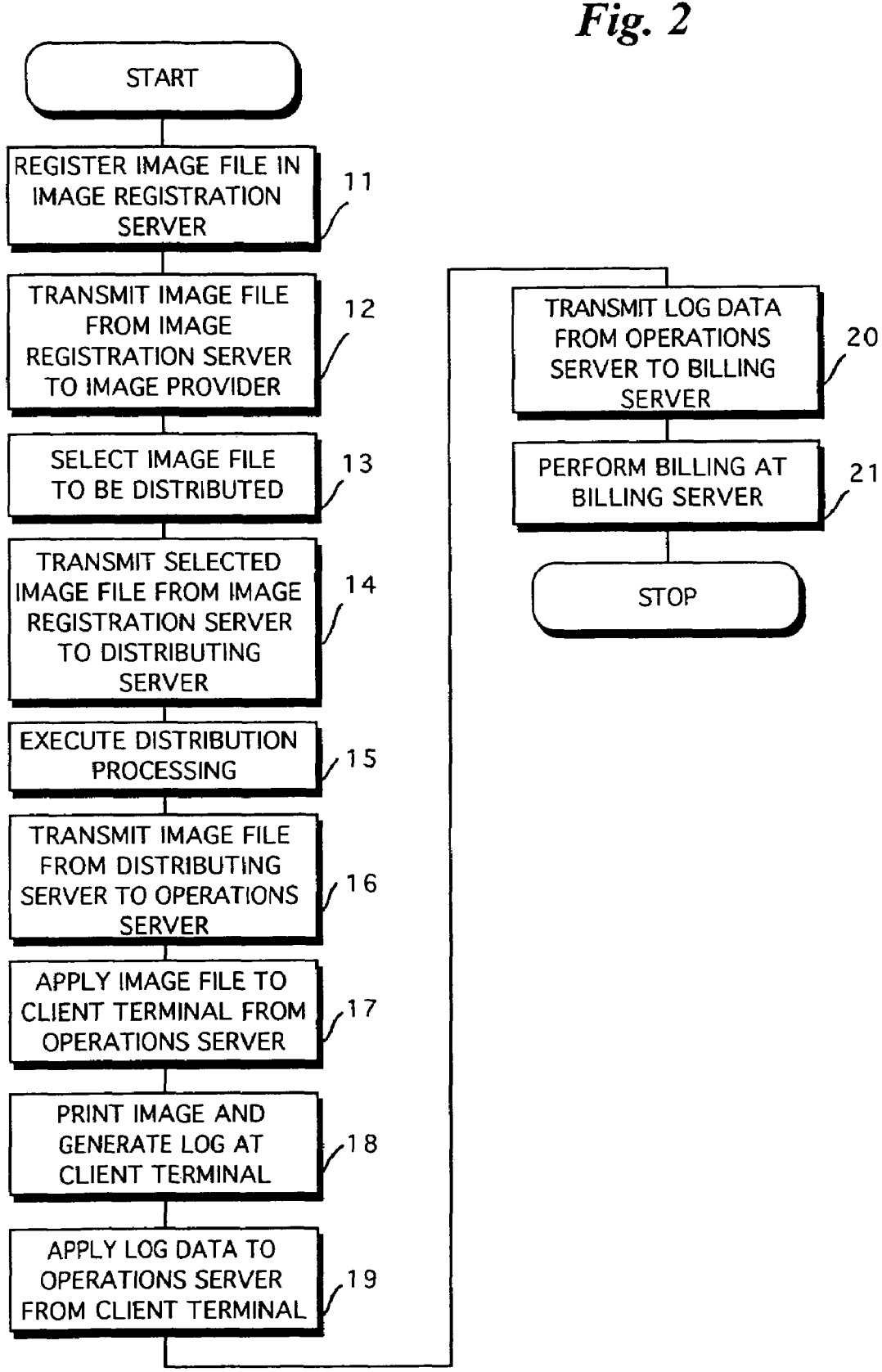
FIG. 2 is a flowchart illustrating the processing of the overall operation of the image communication system.

FIG. 1 is a block diagram illustrating the general configuration of an image communication system, and FIG. 2 is a flowchart illustrating an overview of the operation of the image communication system.

An image communication system obtains approval to use an image from an individual (referred to as the "image provider"), such as a baseball player, soccer player, singer or actor, who possesses the copyright to the image, and applies the image to a client terminal. The image is printed out at the client terminal and the printed image is delivered to the user.

The image communication system includes an image registration server 1, an image providing server 2, a distributing server 3, an operations server 4 and a billing server 6. These servers are connected by a network so as to be capable of communicating data with one another.

Online client terminals 5A, 5B capable of communicating with the operations server 4 are included in the image communication system. Furthermore, offline client terminals 5F, 5G, which input/output image data via a portable recording medium such as a memory card, CD-ROM (compact disc read-only memory) or FD (floppy disk), are included in the image communication system. The online client terminals 5A, 5B and offline client terminals 5F, 5G are installed at game centers, record stores, amusement parks and the like. It goes without saying that although the two online client terminals 5A, 5B and two offline client terminals 5F, 5G are illustrated in FIG. 1, a greater number of these terminals may be provided.

First, an image is supplied by the image provider. Image data representing the supplied image is encrypted by the image registration server 1. An image file which contains the encrypted image data is registered in the image registration server 1 (step 11). The image file that has been registered in the image registration server 1 is transmitted from the image registration server 1 to the image providing server 2 (step 12).

When image files are received by the image providing server 2, an image file that is to be distributed is selected from the received image files by the operator of the image providing server 2 (step 13). The selected image file is transmitted from the image providing server 2 to the distributing server 3 (step 14), which then proceeds to execute predetermined distribution processing (step 15). The image file is transmitted from the distributing server 3 to the operations server 4 (step 16).

The image file is applied, by transmission or distribution, to the corresponding client terminals among the online client terminals 5A, 5B and offline client terminals 5F, 5G (step 17). If terminals to which the image file is to be applied are the online client terminals 5A, 5B, the image file is transmitted from the operations server 4. If the terminal to which the image file is to be applied is an offline client terminal 5F, 5G, the image file is recorded on the portable recording medium at the operations server 4. The portable recording medium on which the image file has been recorded is carried to the offline client terminal 5F or 5G, where the image file is read from the portable recording medium.

Image data contained in an image file is decrypted at the client terminals 5A, 5B, 5F, 5G. The image represented by the decrypted image data is printed (step 18). The printed image is delivered to the user of the client terminal in exchange for a fee. A log to the effect that the image has been printed also is generated at the client terminal.

Data representing the log generated by the client terminal is applied to the operations server 4 (step 19). In case of the online client terminals 5A, 5B, the log data is transmitted from the online client terminals 5A, 5B to the operations server 4 by communication. In case of the offline client terminals 5F, 5G, the log data is recorded on the portable recording medium and the medium is carried to the operations server 4. The latter reads the log data that has been recorded on the portable recording medium.

Log data input to the operations server 4 is transmitted to the billing server 6 (step 20). On the basis of the log data, the billing server 6 executes billing processing for each client terminal (step 21). If necessary, a user fee is paid to the image provider in accordance with the totaled bill.

Further details of the image communication system will become apparent from the description that follows.

FIG. 3 is a block diagram illustrating the electrical construction of the image registration server 1.

The overall operation of the image registration server 1 is controlled by a CPU 31. The latter functions also to encrypt image data based upon a program.

A flatbed scanner 39 and a card reader 40 are connected to the image registration server 1. An image is read from the image provider by the flatbed scanner 39 and card reader 40. If the image is a visible recording medium such as a photograph, poster or calendar, the image is read by the flatbed scanner 39 and the image data representing the image is output from the flatbed scanner 39. If the image has been converted to image data and stored on a memory card, then the memory card is inserted into the card reader 40. The image data that has been stored on the memory card is read by the card reader 40. The image data output from the flatbed scanner 39 or card reader 40 is input to the image registration server 1 by an SCSI (Small Computer System Interface) 32.

The image registration server 1 includes a memory 33 for storing data temporarily and a hard-disk drive 34 for accessing a hard disk. The image registration server 1 further includes a modem 35 for communication via a network, and a keyboard/mouse control circuit 36 for controlling operation based upon an operating command from a keyboard and mouse 38. A display unit 41 controlled by a display control circuit 37 is connected to the image registration server 1.

In this embodiment, the size of an image to be printed is specific to each client terminal. Accordingly, processing to adjust the size of the image data is executed by the image registration server 1 so as to obtain a size suited to the printed image at each client terminal. The image data, which has been processed to adjust the size, is stored in the hard disk corresponding to each client terminal.

FIG. 4 illustrates the corresponding relationship between client terminals and encryption keys.

In the communication system according to this embodiment, image data input to the image registration server 1 is encrypted thereby. As mentioned above, the encrypted image data is transmitted to the servers 2, 3 and 4 and then is applied to the online client terminals 5A, 5B or offline client terminals 5F, 5G. Accordingly, data indicative of encryption keys used in encryption has been stored on the hard disk.

The encryption key differs for each client terminal. (The encryption key may differ for each group comprising a plurality of client terminals.) Data indicative of decryption keys which correspond to the encryption keys has been stored in respective ones of the client terminals. Image data that has been encrypted using encryption keys corresponding to the client terminals can be decrypted by the decryption keys corresponding to these encryption keys. This means that while encrypted image data can be decrypted at one client terminal, the encrypted image data cannot be decrypted at the other client terminals. Of course, this does not prevent the use of a common key for all client terminals.

Figure 5:
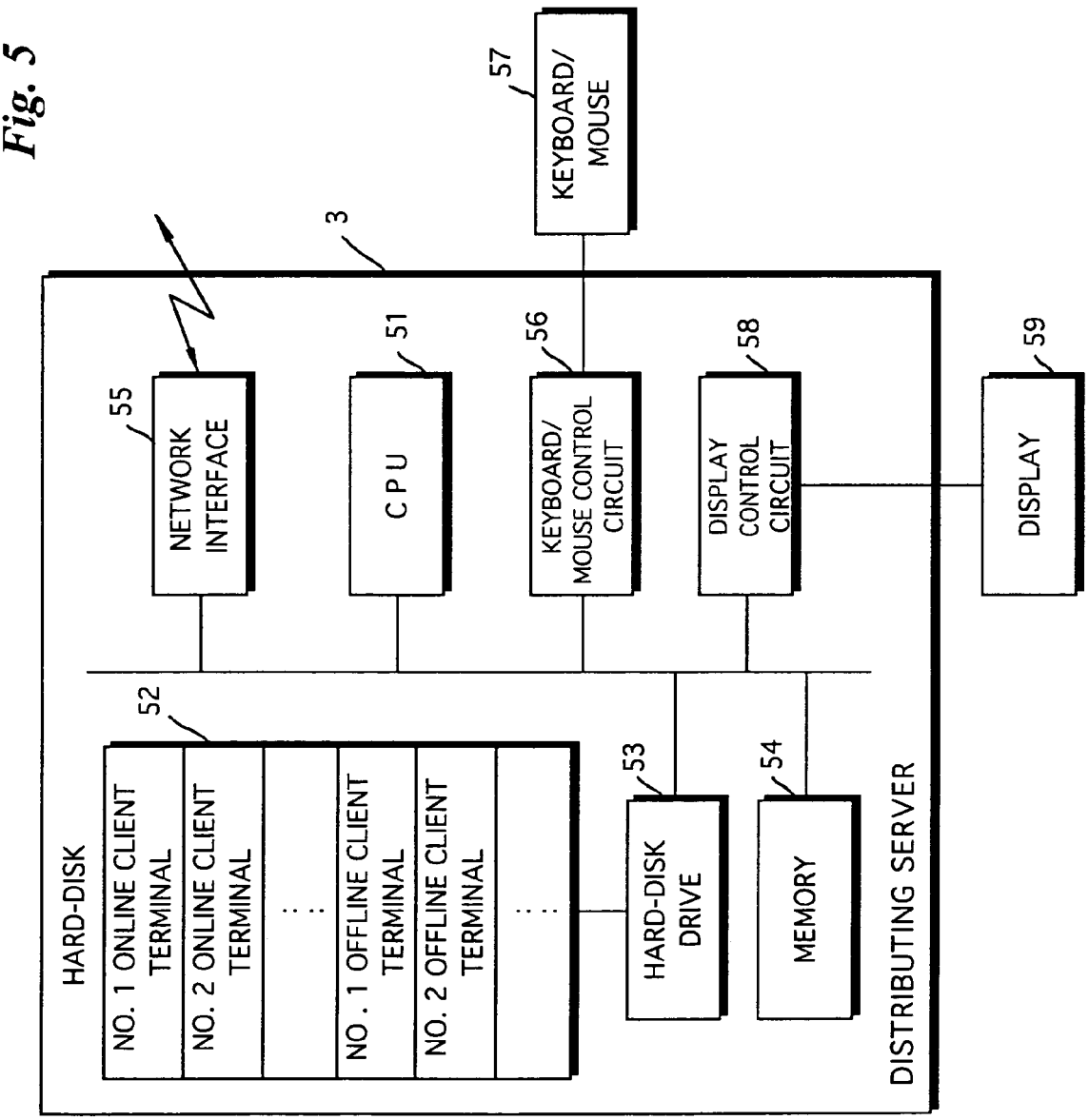
FIG. 5 is a block diagram illustrating the electrical construction of a distributing server.

FIG. 5 is a block diagram illustrating the electrical construction of the distributing server 3.

The overall operation of the distributing server 3 is controlled by a CPU 51.

The distributing server 3 includes a hard disk 52, a hard-disk drive 53 for accessing the hard disk 52 and a memory 54 for storing data temporarily. The distributing server 3 further includes a network interface 55 for communicating with the other servers 1, 2, 4 and 6, and a keyboard/mouse control circuit 56 for controlling the distributing server 3 based upon an operating command from a keyboard and mouse 57. A display unit 59 controlled by a display control circuit 58 is connected to the distributing server 3. For each client terminal to which image data is to be applied, the image data is stored in a prescribed area of the hard disk 52 in distributing server 3.

Figure 6:
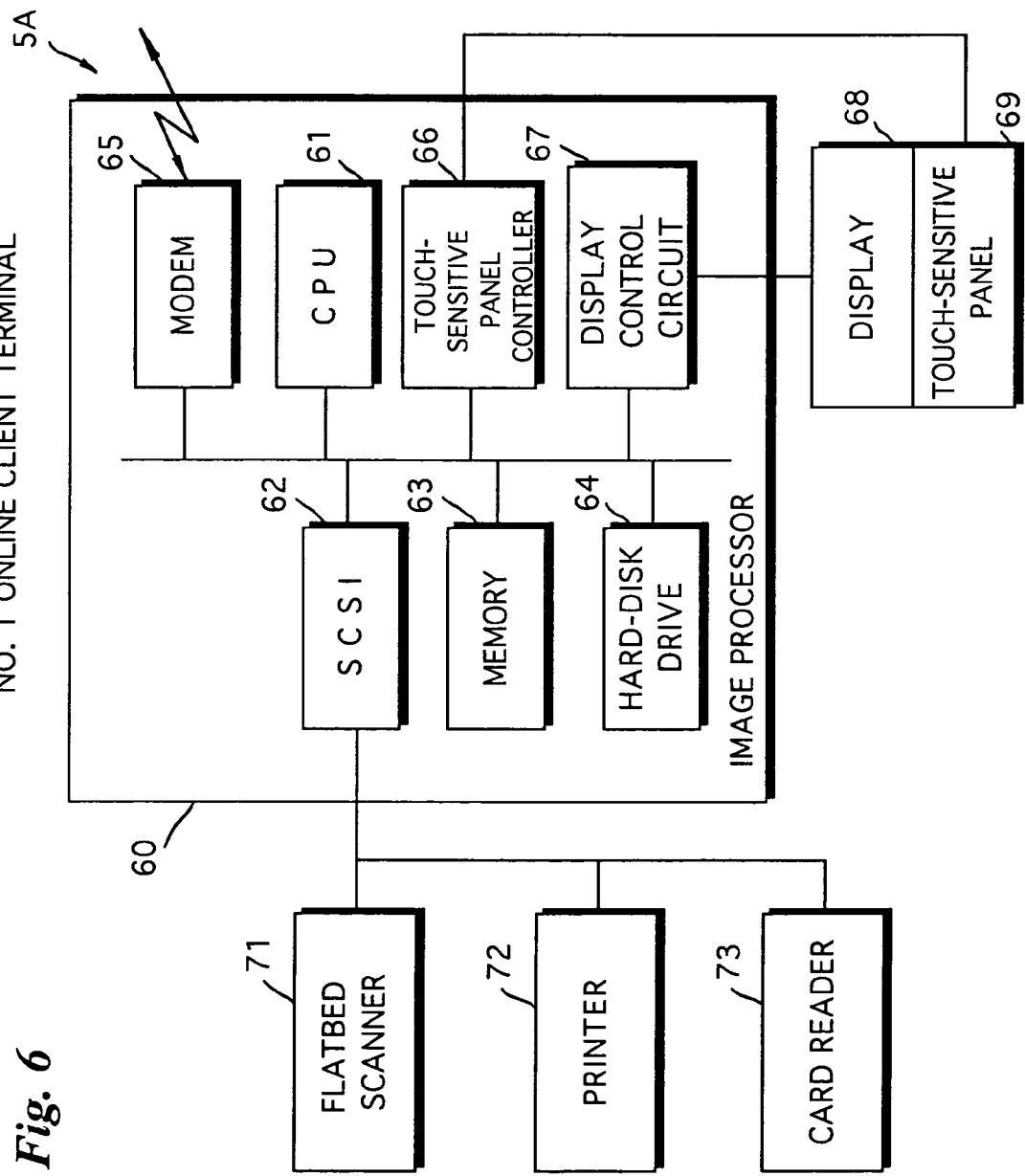
FIGS. 6 and 7 are block diagrams illustrating the electrical constructions of online and offline client terminals, respectively.

FIG. 6 is a block diagram illustrating the electrical construction of the online client terminal 5A. The other online client terminal 5B is similarly constructed.

The overall operation of the online client terminal 5A is controlled by a CPU 61. The latter functions also to execute processing for decrypting image data based upon a program.

A flatbed scanner 71, a printer 72 and a card reader 73 are connected to the client terminal 5A. An image that has been recorded on a visible recording medium is read by the flatbed scanner 71, and an image that has been recorded on a memory card is read by the card reader 73. The image data that has been read is input to an image processing circuit 60 by an SCSI 62. Further, an image represented by image data is printed out by the printer 72.

The image processing circuit 60 of the terminal 5A includes a memory 63 for storing data temporarily and a hard-disk drive 64 for accessing a hard disk. The image processing circuit 60 includes a modem 65 for communicating with the operations server 4.

A display unit 68 controlled by a display control circuit 67 is connected to the image processing circuit 60 of the terminal 5A. A touch-sensitive panel 69 is formed on the screen of the display unit 68. A signal indicating that the touch-sensitive panel 69 has been touched is input to the image processing circuit 60 by a control circuit 66 for the touch-sensitive panel 69.

Data indicative of the decryption key specific to the terminal 5A, a specific serial number (ABC0001) and a terminal ID have been stored on the hard disk of the terminal 5A, as mentioned earlier.

Figure 7:
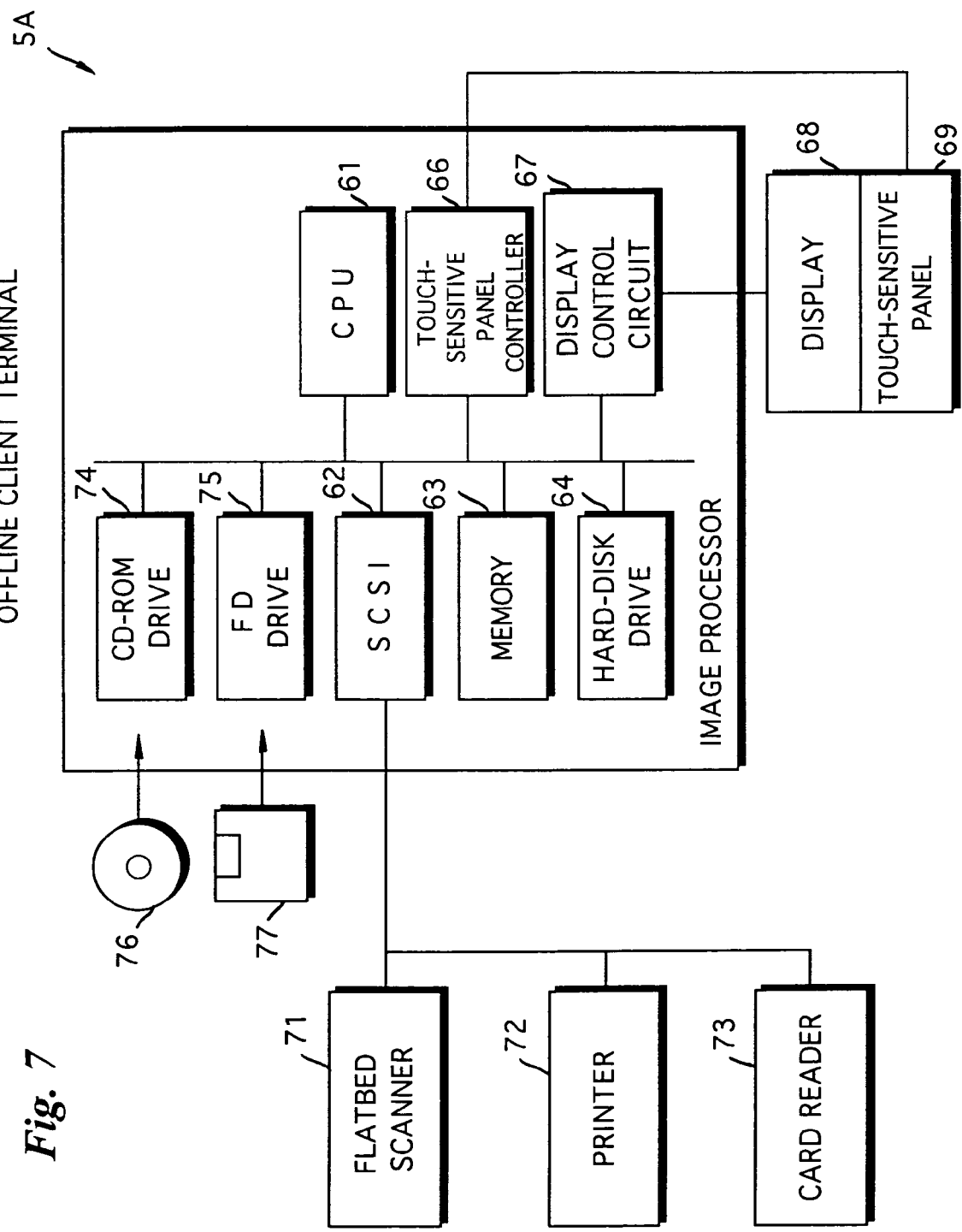

FIG. 7 is a block diagram illustrating the electrical construction of the offline client terminal 5F. Circuits in FIG. 7 identical with those of the online client terminal 5A shown in FIG. 6 are designated by like reference characters and need not be described again.

The offline client terminal 5F differs from the online client terminal 5A in that it is devoid of the modem 65 and includes a CD-ROM drive 74 for reading data that has been written to a CD-ROM 76 and an FD drive 75 for writing data to a floppy disk 77.

Image data has been written in and stored on the CD-ROM 76 by the operations server 4, as mentioned earlier. As will be described later, the number of installations of image data and an installation key that have been written to the CD-ROM 76 are written to the floppy disk 77. Image data that has been written to the CD-ROM 76 is installed only in a prescribed offline client terminal using these items of data.

Figure 8:
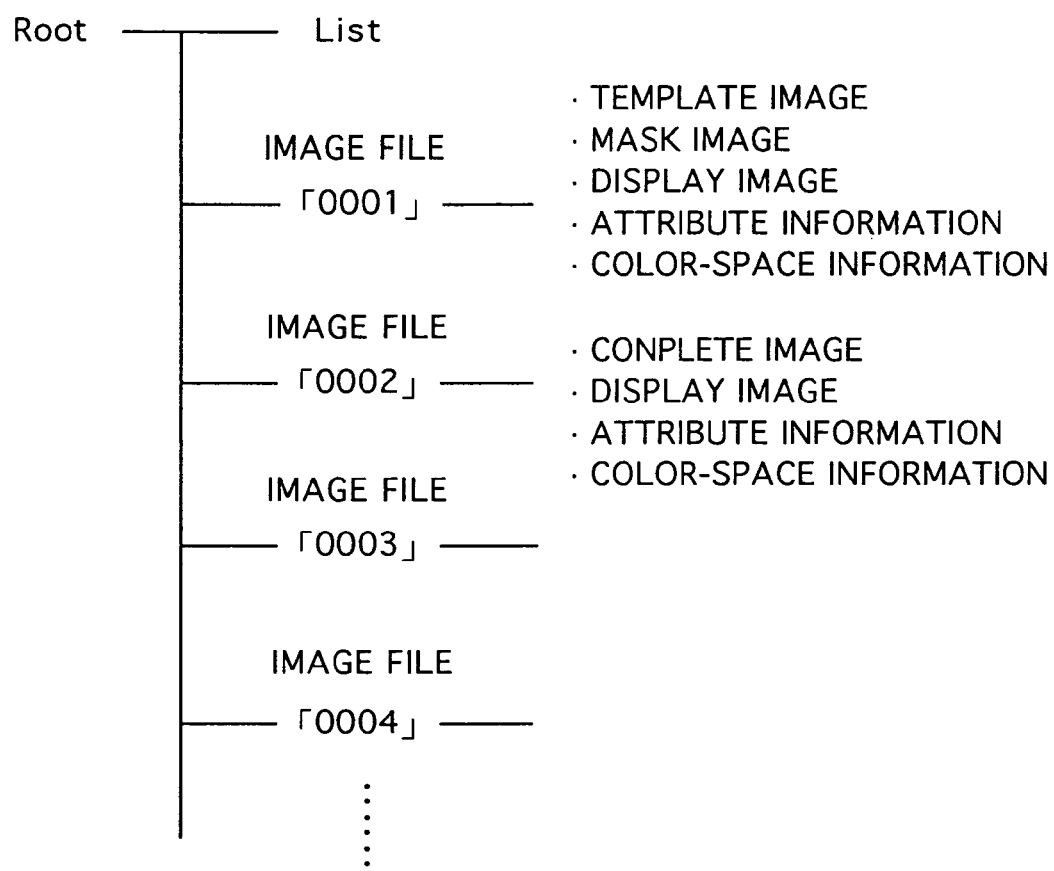
FIG. 8 illustrates the organization of image files.

FIG. 8 illustrates the organization of image files registered at the image registration server 1.

As shown in FIG. 8, "LIST" and image files (where "0001", "0002", "0003", "0004" are the file names of the image files) are managed by "ROOT". The file names of the image files managed by this arrangement and data indicating the types of images (template image or complete image) represented by the image data contained in the image files have been stored in "LIST". A template image is an image which, by being combined with another image, provides a complete image. A template image is formed to have a window. By combining another image, e.g., an image representing the face of the user, with the window, a complete image of one frame is obtained. A mask image for defining the window with regard to the template image also has been stored in the image file together with the template image. A complete image by itself constitutes an image of one frame.

The image file contains an image for display, attribute information and color-space information in addition to the template image and mask image or the complete image.

The image for display is an image displayed on the display unit. The display image has a resolution lower than that of the template image or complete image (the template image and complete image are used for printing). The complete image and the template image are encrypted, as mentioned earlier, but the display image is not. Accordingly, the display image can be displayed at each of the servers 1, 2, 3 and 4 without being decrypted.

The attribute information includes print target information indicating the client terminal to which image data is to be applied, image ID, image information, print information, copyright information and billing information. The image information includes image type indicating whether an image is a complete image or template image, by way of example, image size and image format. The print information includes printable size, printing orientation and printable media. The billing information includes the amount of money, due date and number of valid prints.

With regard to a template image, the attribute information includes template information and mask image information. The template information includes an ID indicating the category of the template and, if the template image is a calendar image, the total number of pages of the calendar and the calendar number, etc. The mask image information includes data indicating the number of masks, mask size and mask position.

The color-space information is data indicating the optimum color space of the image.

By registering files in the image registration server 1, the image files are stored in accordance with the organization shown in FIG. 8.

Figure 9:
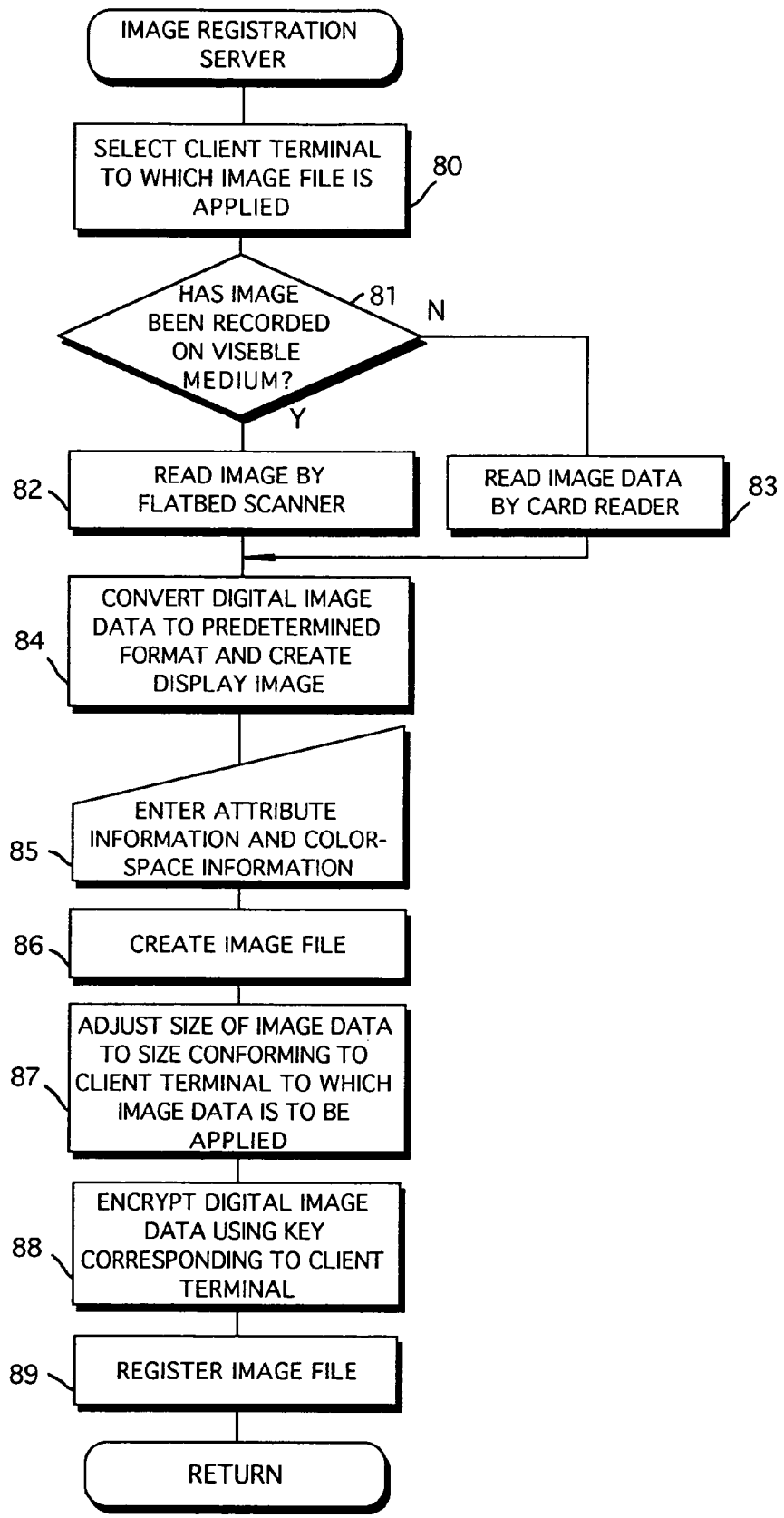
FIG. 9 is a flowchart illustrating processing executed by the image registration server.

FIG. 9 is a flowchart illustrating the processing (step 11 in FIG. 2) executed by the image registration server 1.

The operator of the image registration server 1 receives images from the image provider. A client terminal to which an image from among these received images is to be distributed is selected by the keyboard and mouse 38 (step 80).

A check is performed to determine whether the image received from the image provider has been recorded on a visible recording medium (step 81). If the image has been recorded on a visible recording medium ("YES" at step 81), then this image is read by the flatbed scanner 39 (step 82). Image data that has been output from the flatbed scanner 39 is applied to the memory 33, where the data is stored temporarily. If the image is one represented by image data that has been recorded on a memory card ("NO" at step 81), then the memory card is inserted into the card reader 40. The image data that has been stored on the memory card is read by the card reader 40 and stored in memory 33 temporarily. It goes without saying that when the image data representing the image provided by the image provider has been stored on a CD-ROM or floppy disk, the image registration server 1 is provided with a CD-ROM drive and an FD drive to read the image data.

Image data that has been stored in the memory 33 is converted to data having a predetermined format (step 84). Further, pixel interpolation processing is executed by the CPU 31 to create a display image. Data representing the display image that has been created is also stored in memory 33 temporarily.

Attribute information and color-space information is entered by the operator (step 85). The entered attribute information and color-space information is also stored in memory 33 temporarily. An image file is generated from the data representing the template image and mask image or the data representing the completed image, the image data representing the display image, the attribute information and the color-space information, which have been stored in the memory 33, and a prescribed image-file name is attached to this image file (step 86).

If the image data is converted, it is entered by the client terminal to which the image data is to be applied. The image data undergoes a size adjustment to obtain the image size printed by the client terminal (step 87). It goes without saying that the size of the image printed by the client terminal is applied to the image registration server 1 beforehand.

If the image data is subjected to a size adjustment, then the encryption key corresponding to the client terminal selected at step 80 is read out of the hard disk. For example, if the selected client terminal is the online client terminal 5A, then the key A is read out of the hard disk. Encryption of the image data that has been stored in the memory 33 is carried out through a prescribed method using the key that has been read out (step 88). It goes without saying this encryption is for application to a complete image and template image.

The generated image file is registered in accordance with the organization shown in FIG. 8 described above (step 89).

The image file thus registered is transmitted from the image registration server 1 to the image providing server 2, as described above. The image file received by the image providing server 2 is transmitted to the distributing server 3.

Figure 11:
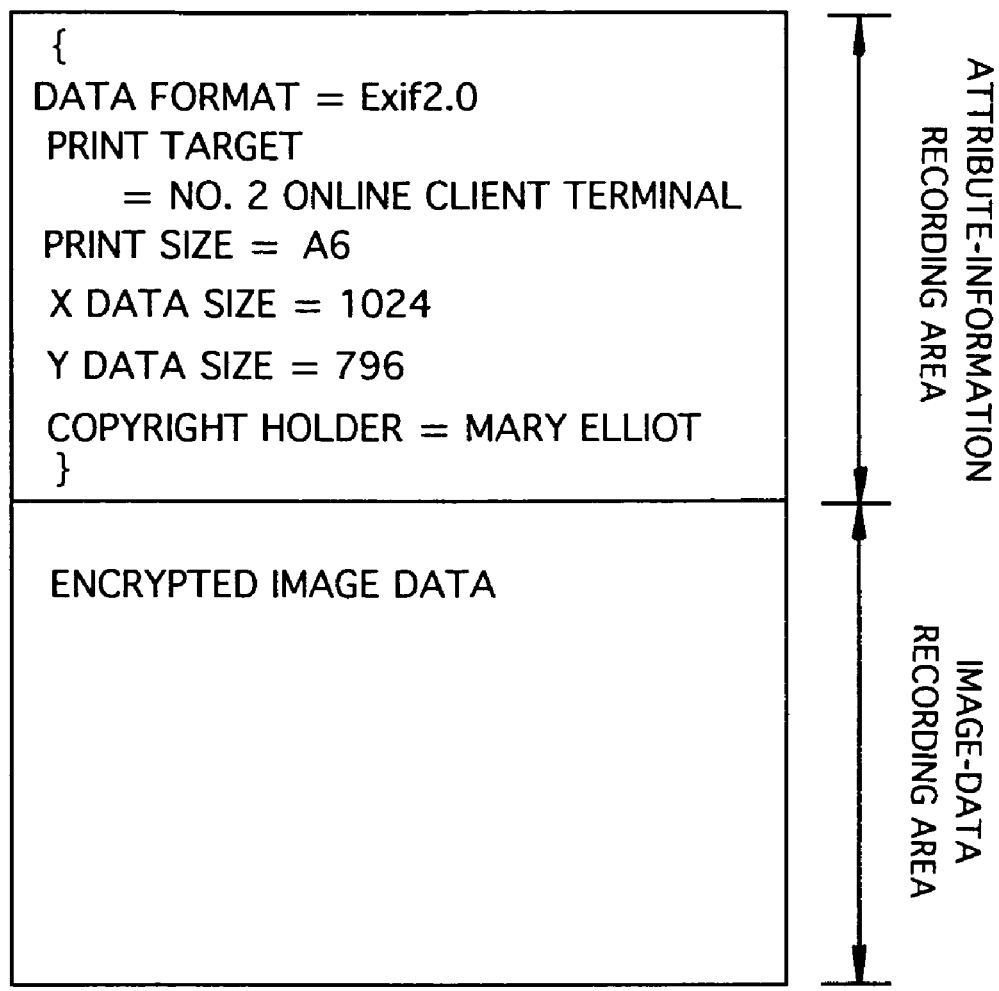
FIG. 11 illustrates the content of the attribute-information recording area and image-data recording area included in an image file.

FIGS. 10a, 10b and FIG. 11 illustrate the data structure of attribute information and image data in an image file.

FIG. 10a illustrates the data structure of image data (the structure of the image file) in the image registration server 1 before conversion of the data size, and FIG. 10b illustrates the data structure of image data (the structure of the image file) in the image registration server 1 after conversion of the data size.

Before the image data undergoes a size conversion, encrypted image data is stored in an image-data recording area, as shown in FIG. 10a.

Stored in an attribute-information recording area are the data format, print target (the client terminal to which the image data is to be applied), the size of the print at the print target, the X- and Y-direction sizes of the image data that has been stored in the image-data recording area, and the copyright holder of the image represented by the image data that has been recorded in the image-data recording area (only some of the attribute information is shown). No print-size data is stored before the conversion.

If the size of image data is converted at the image registration server 1 in the manner described above (the processing of step 87 in FIG. 9), then, as shown in FIG. 10b, data indicating the size of the print image of the client terminal that is the print target (in FIG. 10b, the print target is the No. 1 online client terminal and the print size is A4) is stored as the print size in the attribute-information recording area. Also stored are the X- and Y-direction sizes conforming to the print size.

Image data after the size conversion is encrypted and stored in the image-data recording area.

FIG. 11 illustrates the manner in which the attribute information and image data have been stored after the size conversion, where the print target is the No. 2 online client terminal.

The No. 2 online client terminal prints an image of size A6. Data indicative of "A6", therefore, has been stored as the print size. Further, data indicating the X- and Y-direction sizes corresponding to the image of size A6 has been stored as well.

Thus, the size of image data is adjusted at the image registration server 1 so as to conform to the print size of the client terminal to which the image data is to be applied.

Figure 12:
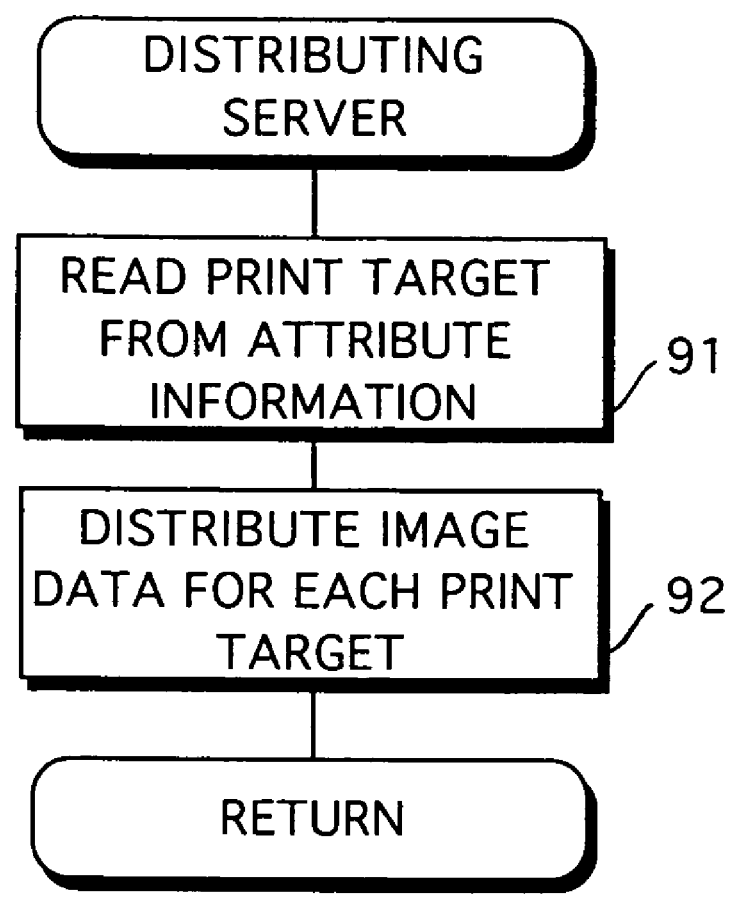
FIG. 12 is a flowchart illustrating processing executed by the distributing server.

FIG. 12 is a flowchart illustrating processing (the processing of step 15 in FIG. 2) executed by the distributing server 3.

The print target is read from the attribute information contained in the image file (step 91).

The image data is distributed for each print target and is stored on the hard disk 52 (step 92).

When the distributing server 3 finishes executing the processing shown in FIG. 12, this image file is transmitted from the distributing server 3 to the operations server 4. The latter applies the image file to the client terminal constituting the print target that has been written in the attribute information. If the client terminal is online, the image file is applied to the terminal by transmission. If the client terminal is offline, the image file is written to the CD-ROM and the CD-ROM is carried to the corresponding offline client terminal.

Figure 13:
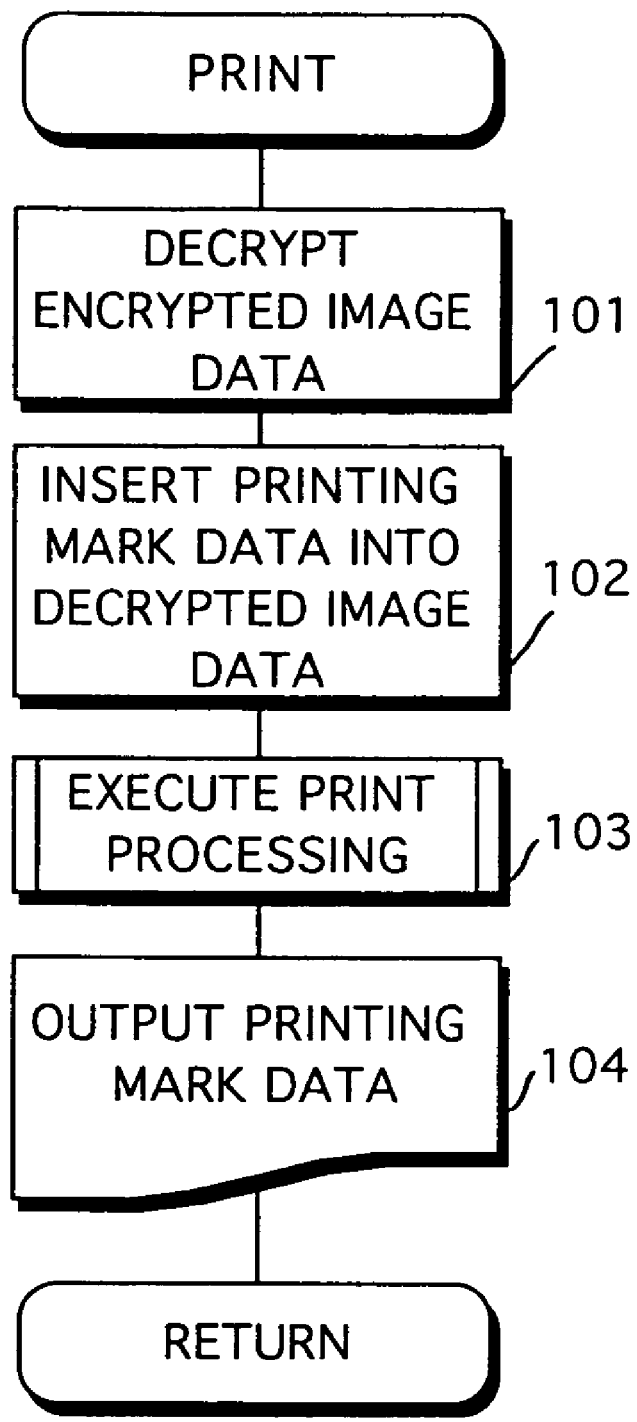
FIG. 13 is a flowchart illustrating printing processing at a client terminal.
Figure 14:
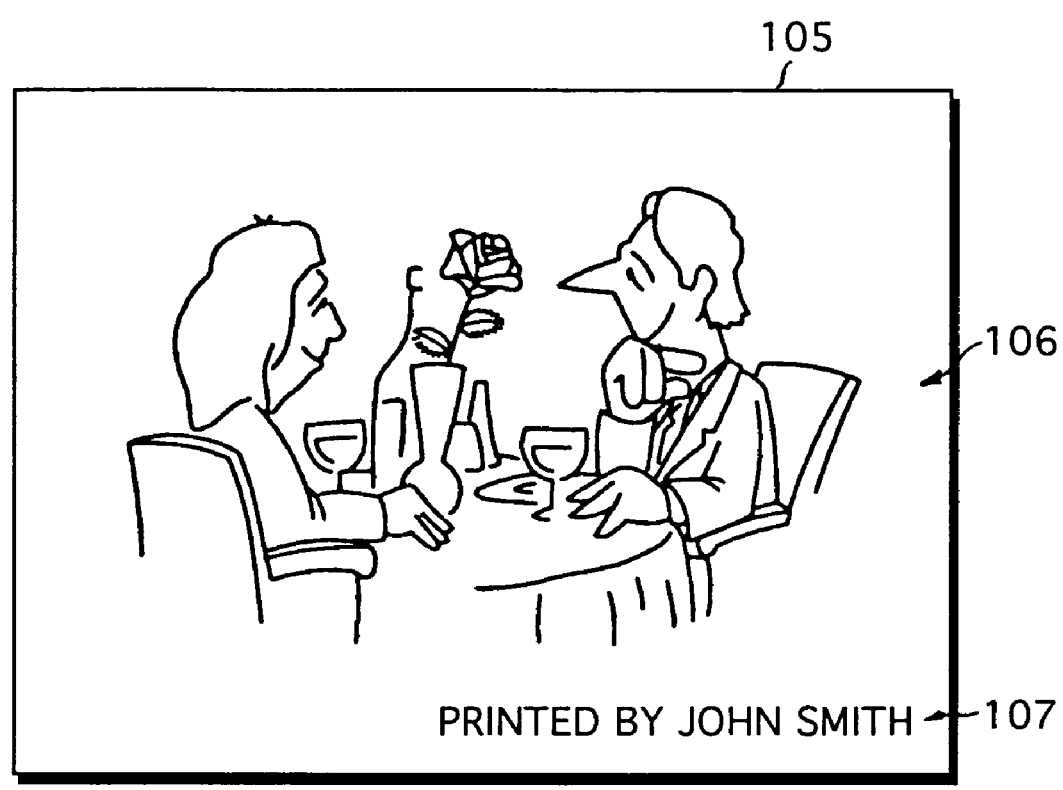
FIG. 14 illustrates an example of an image printed at the client terminal.

FIG. 13 is a flowchart illustrating printing processing (the processing of step 18 in FIG. 12) executed by a client terminal, and FIG. 14 illustrates an example of an image printed at the client terminal.

If the client terminal is online, an image file that has been transmitted from the operations server 4 by the modem 65 is received and the received image file is stored in the memory 63 temporarily. If the client terminal is offline, the CD-ROM 76 to which the image file has been written is set in the CD-ROM drive 74 and the image data that has been written to the CD-ROM 76 is read by the CD-ROM drive 74. The read image data is applied to the memory 63 and stored there temporarily.

Display images are displayed on the display unit 68. In response to touching of the touch-sensitive panel 69 by the user, the image to be printed is selected.

A decryption key that has been stored on the hard disk of the client terminal is read out. From the image data that has been stored in the memory 63, image data for printing corresponding to the display image selected by the user is decrypted using the decryption key that has been read out (step 101). Print-mark data indicating the copyright holder based upon the copyright information that has been stored in the image file is inserted into the decrypted image data (step 102).

The image data into which the print-mark data has been inserted is applied to the printer 72 so that the image represented by the image data is printed (step 103). The printed image is thus output (step 104).

As shown in FIG. 14, the image representing the image data appears in an image recording area 106 on an output print 105. A copyright-information recording area 107 is formed at the lower right of the print 105. Information regarding the copyright holder represented by the print-mark data appears in the copyright-information recording area 107. In the example depicted in FIG. 14, characters reading "Printed by JOHN SMITH" appear in the copyright-information recording area 107. Here "JOHN SMITH" indicates the image copyright holder. Since the image copyright holder can be ascertained at a glance, copyright infringement can be prevented.

Further, since a decryption key corresponding to the encryption key has been stored only in the terminal that is the print target, decryption can be carried out only at the terminal that is the print target and not at other terminals. This means that the encrypted image data can be decrypted only at the client terminal of an operator who has the rightful privilege to use the image. Since the encrypted image data cannot be decrypted at a client terminal of an operator who does not possess the rightful privilege to use the image, it is possible to prevent unlawful use of image data by the operator of the client terminal.

Figure 15:
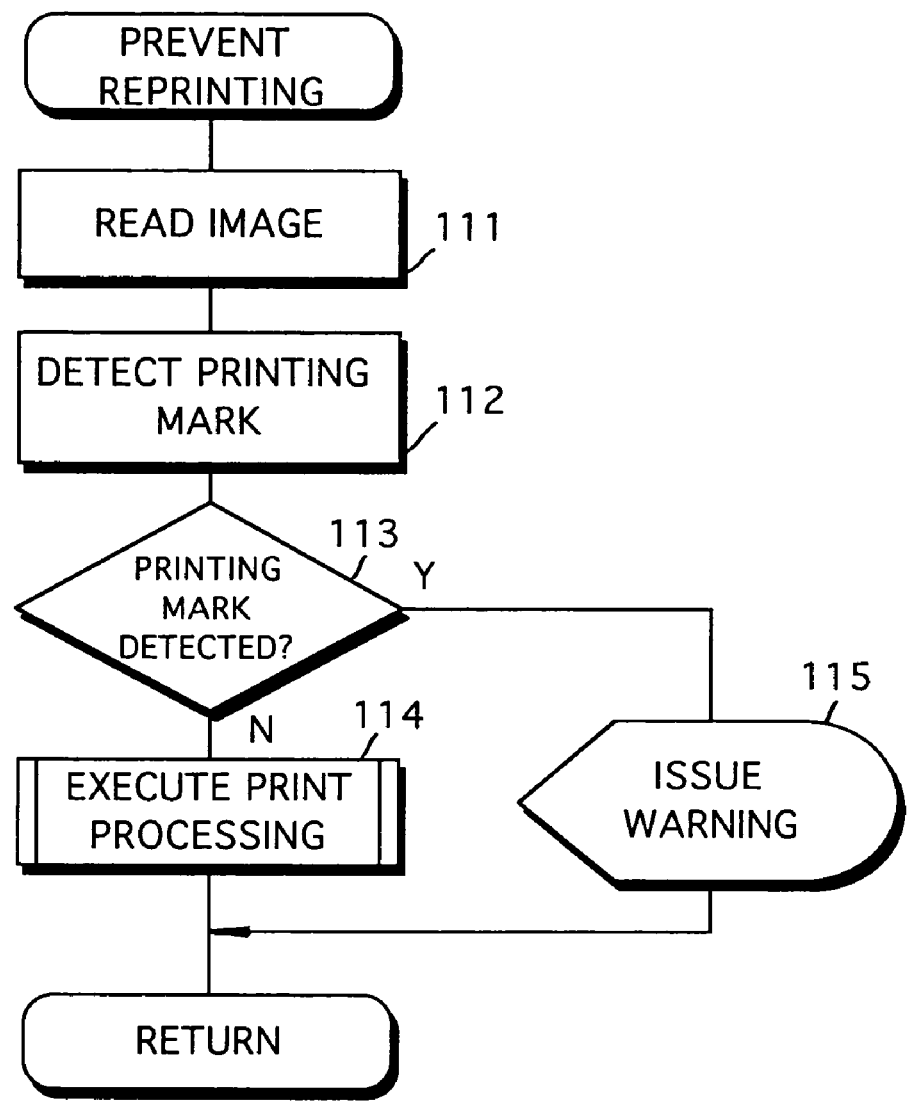
FIG. 15 is a flowchart illustrating processing for preventing reprinting.

FIG. 15 is a flowchart illustrating processing (the processing of step 18 in FIG. 2) for preventing unlawful reprinting at a client terminal.

If an image is printed in the manner described above, there are instances where the image is read using a scanner and printed again. FIG. 15 illustrates processing for preventing such unlawful reprinting.

A visible recording medium is placed on the flatbed surface of the flatbed scanner 71 and the image that has been recorded on the visible recording medium is read (step 111). Next, processing for detecting a printing mark from the copyright-information recording area 107 of the read image is executed (step 112).

If the read image contains a printing mark ("YES" at step 113), a decision is rendered to the effect that this is unlawful printing and a warning to this effect is displayed on the display unit 68 (step 115). Processing for printing the image represented by the image data read by the scanner 71 is suspended.

If the read image does not contain a printing mark ("NO" at step 113), then it is decided that this is not unlawful printing. Accordingly, print processing is executed by the printer 72 (step 114).

Figure 16:
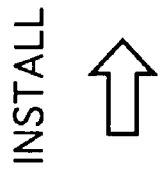
FIG. 16 illustrates number of installations and an installation key before and after installation of image data.

FIG. 16 illustrates the manner in which data indicating number of installations and data indicating an installation key changes, this data being stored on a floppy disk used when image data is installed in an offline client terminal.

Image data has been stored on the CD-ROM 76, as mentioned above. Further, data indicating number of installations and data indicating an installation key has been stored on the floppy disk 77.

The number of installations indicates the number of times the image data, which has been stored on the CD-ROM, has been installed in the offline client terminal. The installation key is used to prevent unlawful installation of image data that has been stored on the CD-ROM 76.

The CD-ROM 76 is inserted into the CD-ROM drive 74 of the offline client terminal in which the image data is to be installed. Further, the floppy disk 77 paired with the CD-ROM 76 is inserted into the FD drive 75.

In the initial state (i.e., when image data stored on the corresponding CD-ROM 76 has not been installed even once), "0" is stored on the floppy disk 77 as the number of installations and "first time" is stored on the floppy disk 77 as the installation key. If the image data on the CD-ROM 76 is installed, the number of installations is incremented. In addition, the installation key is rewritten to the serial number of the offline client terminal. For example, if the serial number of the offline client terminal is "ABC0001", the installation key is rewritten from "first time" to "ABC0001".

Only an offline client terminal in which the CD-ROM 76 and floppy disk 77 have first been inserted and in which the image data has been installed can have image data installed within it again subsequently.

Figure 17:
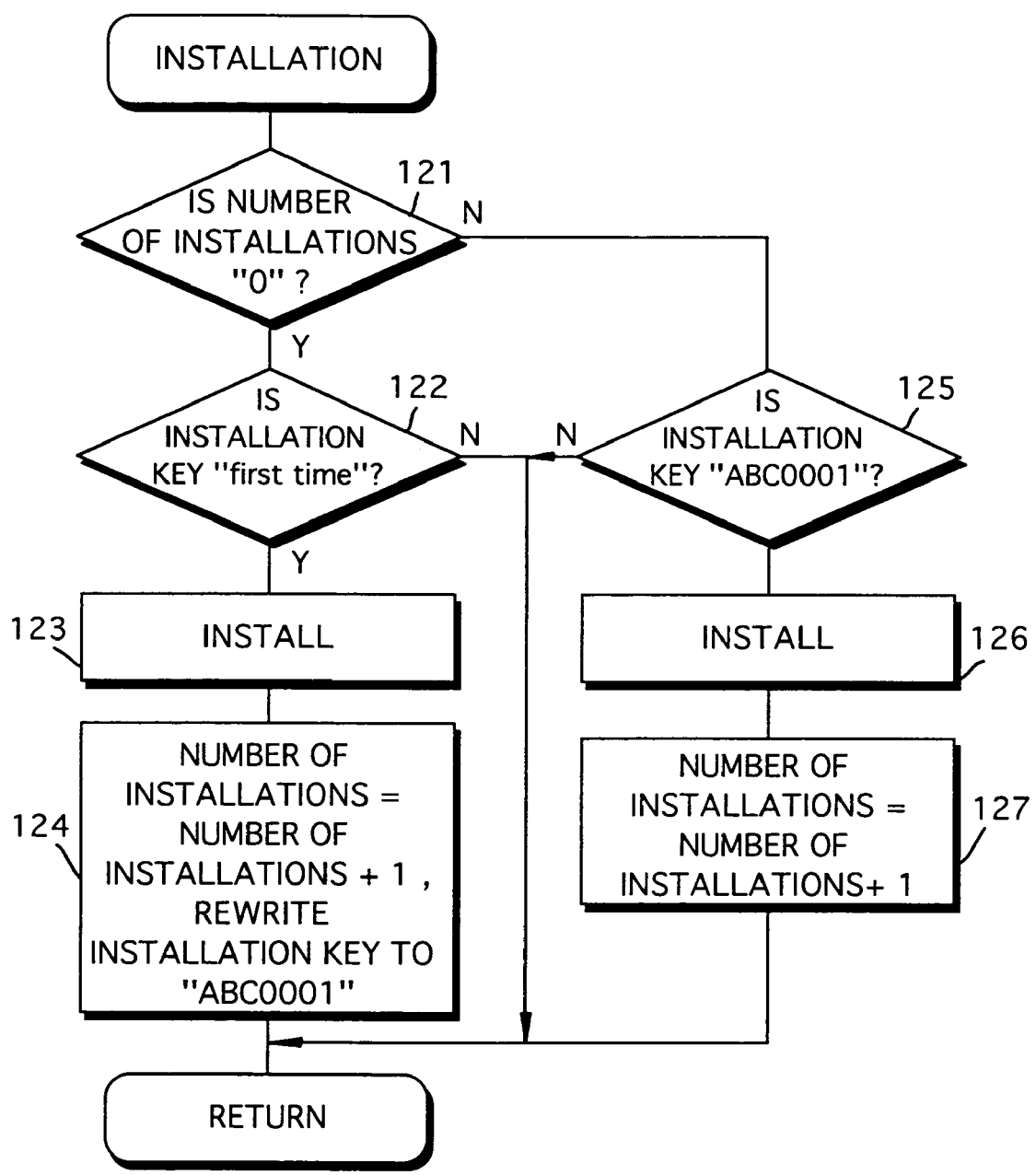
FIG. 17 is a flowchart illustrating processing for installing image data.

FIG. 17 is a flowchart illustrating processing (the processing of step 18 in FIG. 2) for when image data that has been stored on the CD-ROM drive 74 is installed in an offline client terminal.

The CD-ROM 76 is inserted by the operator of the offline client terminal into the CD-ROM drive 74 of the offline client terminal in which image data is to be installed, and the floppy disk 77 corresponding to the CD-ROM 76 is inserted in the FD drive 75 by the operator.

The number of installations is read out of the floppy disk 77 that has been inserted into the FD drive 75. It is determined whether the read number of installations is "0" (step 121). If the number of installations is "0" ("YES" at step 121), this indicates that installation of image data has not yet been carried out. In this case the installation key should be "first time". If the installation key is "first time" ("YES" at step 122), then this is confirmation of initial installation. Accordingly, image data is read from the CD-ROM 76 that has been inserted in the CD-ROM drive 74 and the image data is installed on the hard disk (step 123).

If installation is finished, the number of installations read from the floppy disk 77 is incremented. Data indicating the incremented number of installations is written to the floppy disk 77 by the FD drive 75. The installation key is rewritten from "first time" to the serial number "ABC0001" of the offline client terminal into which the floppy disk 77 has been inserted (step 124).

If the installation key is not "first time" ("NO" at step 122) regardless of the fact that the number of installations read from the floppy disk 77 is "0" ("YES" at step 121), it is considered that some malfunction has occurred. In this case the installation processing is suspended and the fact that some malfunction has occurred is displayed on the display screen of the display unit 68.

If the number of installations read out of the floppy disk 77 is not "0" ("NO" at step 121), this indicates that installation has already been carried out. Next, it is determined whether the installation key is "ABC0001" (step 125).

When the number of installations is not "0" and the installation key is "ABC0001", then it is judged that the operator is attempting to install the image data in an offline client terminal that is the same as the offline client terminal in which installation was performed initially. In this case it is judged that this is processing by a duly authorized person and re-installation of the image data that has been recorded on the CD-ROM 76 is executed (step 126). If installation is finished, the number of installations that has been stored on the floppy disk 77 is incremented (step 127).

If the number of installations is not "0" ("NO" at step 121) and the installation key is not "ABC0001" ("NO" at step 125), then it is construed that the operator is attempted to install image data stored on the CD-ROM 76 in an offline client terminal that is different from the offline client terminal in which installation was performed initially. This installation is judged to be unlawful and, hence, installation processing is inhibited. A warning to this effect would be displayed on the display screen of the display unit 68.

Thus, re-installation of image data is possible only at an offline client terminal in which image data was installed initially. This makes it possible to prevent the unlawful installation of image data in another offline client terminal.

If an image is printed at a client terminal, a history of this printing is generated and data representing the printing history is stored in memory 63 as log data. The log data is supplied from the client terminal to the operations server 4. If the client terminal is online, the log data is transmitted to the operations server 4. If the client terminal is offline, then the log data is written to a floppy disk. The floppy disk to which the log data has been written is carried to the operations server 4 and is read by the operations server 4.

In any case, log data that has been applied to the operations server 4 is transmitted to the billing server 6. The latter executes processing to aggregate the log data.

Figures 18, 19:
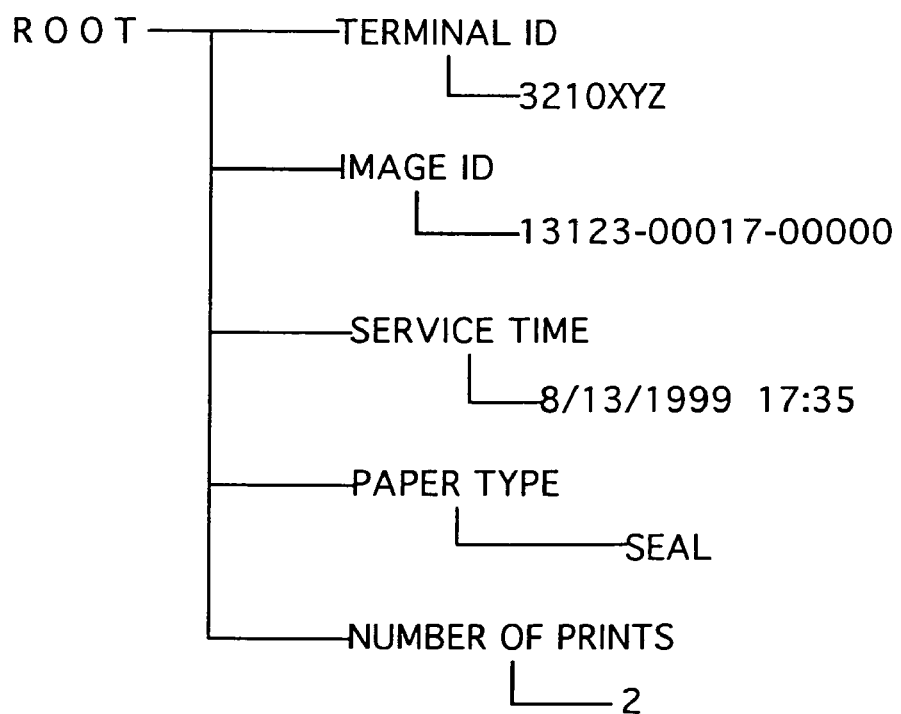
FIG. 18 illustrates an example of log data transmitted from an online client terminal.
FIG. 19 illustrates an example of log data written to a floppy disk at the online client terminal.

FIG. 18 illustrates an example of log data transmitted from an online client terminal.

Log data is signified by a label and contains the following data:

Terminal ID

This is a unique ID for identifying a terminal.

Image ID

This is an ID specific to an image used in printing.

Service Time

This indicates the date and time at which an image was printed.

Paper Type

This indicates the size of the sheet of paper on which an image was printed.

Number of Prints

This indicates the number of prints of an image.

FIG. 19 illustrates the structure of log data stored on a floppy disk by an offline client terminal.

Log data stored on a floppy disk is stored in accordance with a directory structure.

Terminal ID, image ID, service time, paper type and number of prints are managed by "ROOT" and this data is stored on the floppy disk.

Thus, the format of the log data differs depending upon the client terminal. In an image distribution system according to this embodiment, log data supplied from a client terminal is converted to have a unified format and is aggregated in a manner described below.

Figure 20:
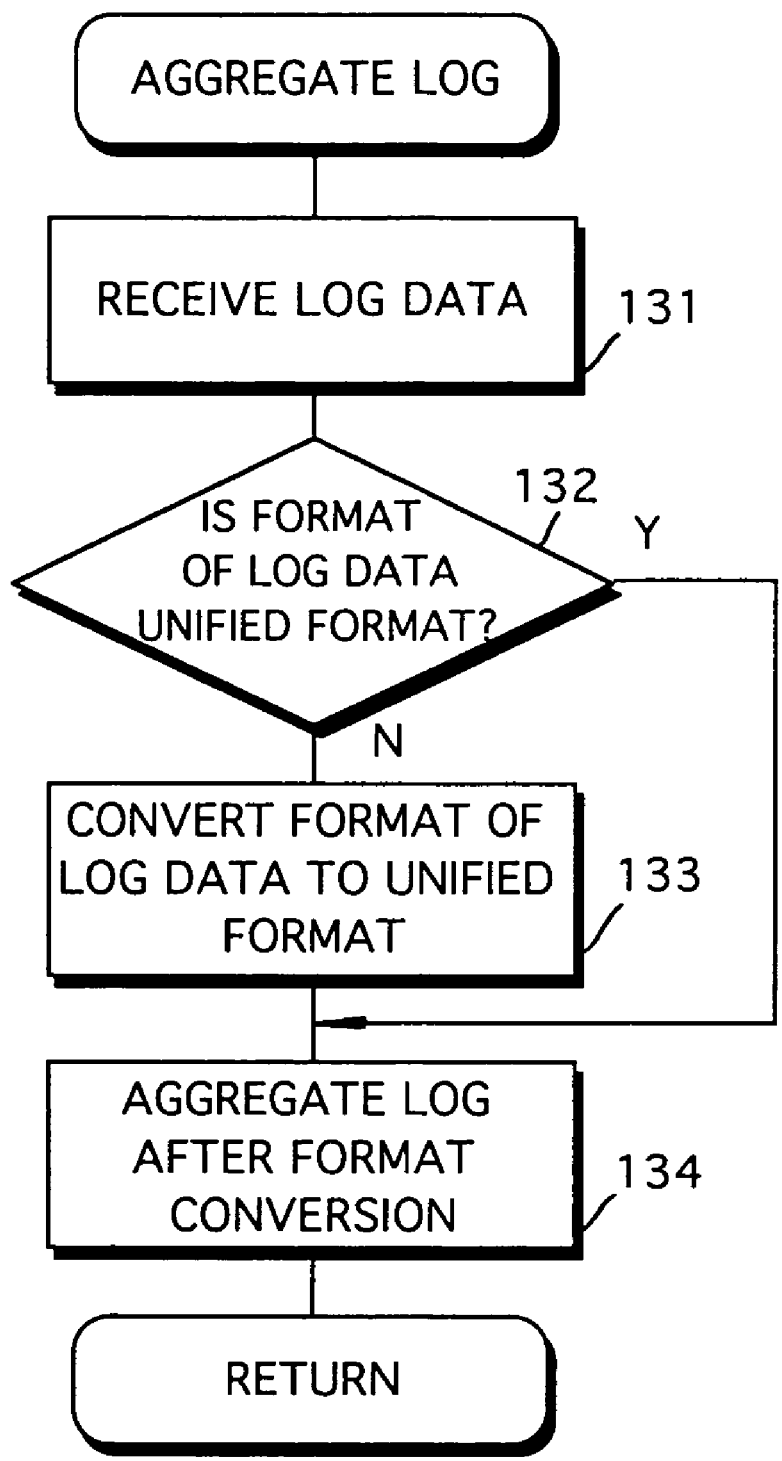
FIG. 20 is a flowchart illustrating processing for log aggregation.

FIG. 20 is a flowchart illustrating processing for aggregating log data, FIG. 21 illustrates unified-format data for converting log data to data having a unified format, and FIG. 22 illustrates log data the format of which has been unified by the unified-format data.

Log data that has been transmitted from the operations server 4 is received by the billing server 6 (step 131), as mentioned above. It is determined whether the received log data has a format identical with the unified format (step 132).

If the received log data does not have a format identical with the unified format, which has been decided in advance ("NO" at step 132), then the format is converted to a predetermined format (step 133) using the unified format shown in FIG. 21. If the received log data does have a format identical with the unified format, which has been decided in advance ("YES" at step 132), then the processing of step 133 is skipped.

If the format is unified, then the log data is aggregated, as shown in FIG. 22, by the billing server 6 (step 134). The aggregated log data is then furnished to the image provider.

It goes without saying that the billing server 6 also has a structure almost the same as that of the image registration server 1 and that the log-data aggregation processing is executed by the CPU. Further, the aggregated log data would be recorded on a memory card by a card reader.

Log data unified to a predetermined format is furnished to the image provider even in a case where log data has been generated in a variety of prescribed formats for each client terminal.

An arrangement may be adopted in which subsequent printing by a client terminal is allowed in dependence upon the printing conditions represented by the log data. For example, if printing has been performed more than a fixed number of times by a client terminal, then printing by this client terminal would be allowed.

In the above-described embodiment, an offline client terminal reads image data that has been recorded on a CD-ROM, records log data on a floppy disk and applies the log data to the operations server 4. However, an arrangement may be adopted in which the offline client terminal is provided with the communication function of a modem or the like and the log data is transmitted to the operations server 4. This is because the quantity of log data is less than that of image data and, hence, requires little time for transmission and can be transmitted efficiently.

As many apparently widely different embodiments of the present invention can be made without departing from the spirit and scope thereof, it is to be understood that the invention is not limited to the specific embodiments thereof except as defined in the appended claims.

What is claimed is:

1. A printing management apparatus for managing printing conditions in a plurality of image printing units which print images represented by image data, wherein data representing printing history is output from the image printing units and said apparatus comprises:

a reading unit for reading data representing the printing history output from the image printing units;

a format conversion unit for converting the data representing the printing history read by said reading unit to data having a predetermined format; and an aggregating unit for aggregating, for each of the plurality of printing units, the data which represents printing history and the format of which has been converted by said format conversion unit.

2. A printing management method for managing printing conditions in a plurality of image printing units which print images represented by image data, wherein data representing printing history is output from the image printing units and said method comprises:

reading data representing the printing history output from the image printing units;

converting the data representing the printing history read to data having a predetermined format; and aggregating, for each of the plurality of printing units, the data which represents printing history and the converted data.

* * * * *